United States Patent
Harris

(10) Patent No.: US 8,934,880 B2
(45) Date of Patent: Jan. 13, 2015

(54) MOVEMENT DETECTION SYSTEM FOR A PORTABLE DEVICE SUCH AS A PORTABLE PHONE

(71) Applicant: Scott C. Harris, Rancho Santa Fe, CA (US)

(72) Inventor: Scott C. Harris, Rancho Santa Fe, CA (US)

(*) Notice: Subject to any disclaimer, the term of this patent is extended or adjusted under 35 U.S.C. 154(b) by 0 days.

(21) Appl. No.: 14/093,654

(22) Filed: Dec. 2, 2013

(65) Prior Publication Data

US 2014/0094154 A1 Apr. 3, 2014

Related U.S. Application Data

(63) Continuation of application No. 13/337,101, filed on Dec. 24, 2011, now Pat. No. 8,600,340.

(60) Provisional application No. 61/427,190, filed on Dec. 26, 2010.

(51) Int. Cl.
| | |
|---|---|
| *H04M 3/42* | (2006.01) |
| *H04W 4/16* | (2009.01) |
| *H04M 1/67* | (2006.01) |
| *G08B 25/01* | (2006.01) |

(52) U.S. Cl.
CPC ......... *H04W 4/16* (2013.01); *H04M 1/67* (2013.01); *G08B 25/016* (2013.01); *H04M 2250/12* (2013.01); *H04M 2250/52* (2013.01)
USPC ............... 455/414.1; 455/404.1; 455/411; 455/412.2; 455/456.4; 455/456.5; 455/456.6; 455/550.1

(58) Field of Classification Search
USPC ............... 455/418, 404.1, 411, 412.2, 414.1, 455/456.4, 456.5, 456.6, 550.1
See application file for complete search history.

(56) References Cited

U.S. PATENT DOCUMENTS

| | | |
|---|---|---|
| 2002/0010008 A1 | 1/2002 | Bork et al. |
| 2004/0137938 A1* | 7/2004 | Deubler, Jr. ............... 455/550.1 |
| 2004/0266416 A1 | 12/2004 | Matsumoto |
| 2005/0083642 A1 | 4/2005 | Senpuku et al. |
| 2008/0119217 A1 | 5/2008 | Coxhill |
| 2008/0191905 A1 | 8/2008 | Martin |
| 2008/0211685 A1 | 9/2008 | Grady |
| 2008/0248801 A1* | 10/2008 | Fletcher et al. ............ 455/435.2 |
| 2008/0259038 A1 | 10/2008 | Hokkanen |
| 2008/0290985 A1* | 11/2008 | Vogedes et al. .............. 340/3.1 |
| 2010/0048256 A1* | 2/2010 | Huppi et al. ................. 455/574 |
| 2010/0254525 A1* | 10/2010 | Maly et al. ................ 379/207.03 |
| 2011/0081889 A1 | 4/2011 | Gao et al. |
| 2011/0207434 A1 | 8/2011 | Rozhkov |
| 2011/0287754 A1* | 11/2011 | Schlueter ..................... 455/418 |

* cited by examiner

*Primary Examiner* — Khalid Shaheed

(74) *Attorney, Agent, or Firm* — Law Office of Scott C. Harris, Inc.

(57) ABSTRACT

An unintentional dialing event is detected by characterizing some action of a portable phone, e.g., its movement or its surroundings. The action can be characterized by a sensor, and that sensor can be for example an accelerometer, a camera in the phone, or a microphone in the phone, or some other way. The movement can be characterized to see if it is synchronous with entries on the keyboard, which would likely represent the unintentional dialing event or "but dialing". The environment can also be characterized other ways, for example by using a microphone in the phone to text sound profiles or to detect sounds in sync with the entries, or can be characterized using a camera in the phone to detect a light profile.

9 Claims, 3 Drawing Sheets

MOVEMENT DETECTION SYSTEM FOR A PORTABLE DEVICE SUCH AS A PORTABLE PHONE

This application is a continuation application of U.S. Ser. No. 13/205,422 filed Dec. 24, 2011, now U.S. Pat. No. 8,600, 340 issued Dec. 3, 2013, which claims priority from Provisional application No. 61/427,190, filed Dec. 26, 2010, the entire contents of which are herewith incorporated by reference.

BACKGROUND

Different kinds of portable devices may be carried by a user and used to receive input from the user that carry out various functions. For example, a very common portable device is a portable phone such as a cell phone. The user enters numbers on a cell phone, then presses send, in order to make a call.

Most or all of these devices also store address books and allow speed dial selections. For example, the device may allow "speed Dial 1" in order to call person 1 on your address list.

Other devices, for example, various kinds of PDAs and the like may be used to enter information.

These devices lost often include locking controls that prevent the keyboard from being unintentionally initiated when it is being transported, for example when in a pocket or purse. Users may forget to turn the lock on, which may lead to unintentional calls being made.

One scenario is so-called "butt dialing", where motions of a user create unintended depression of keys on the cell phone, to call a remote person unintentionally.

SUMMARY

The present describes a system that detects a situation of a device and from that situation determines whether the current selection of items on the user interface is intended. In embodiments, the situation can be sound, light, movement or other features.

BRIEF DESCRIPTION OF THE DRAWINGS

The different figures show different embodiments.

DETAILED DESCRIPTION

Figure 1:
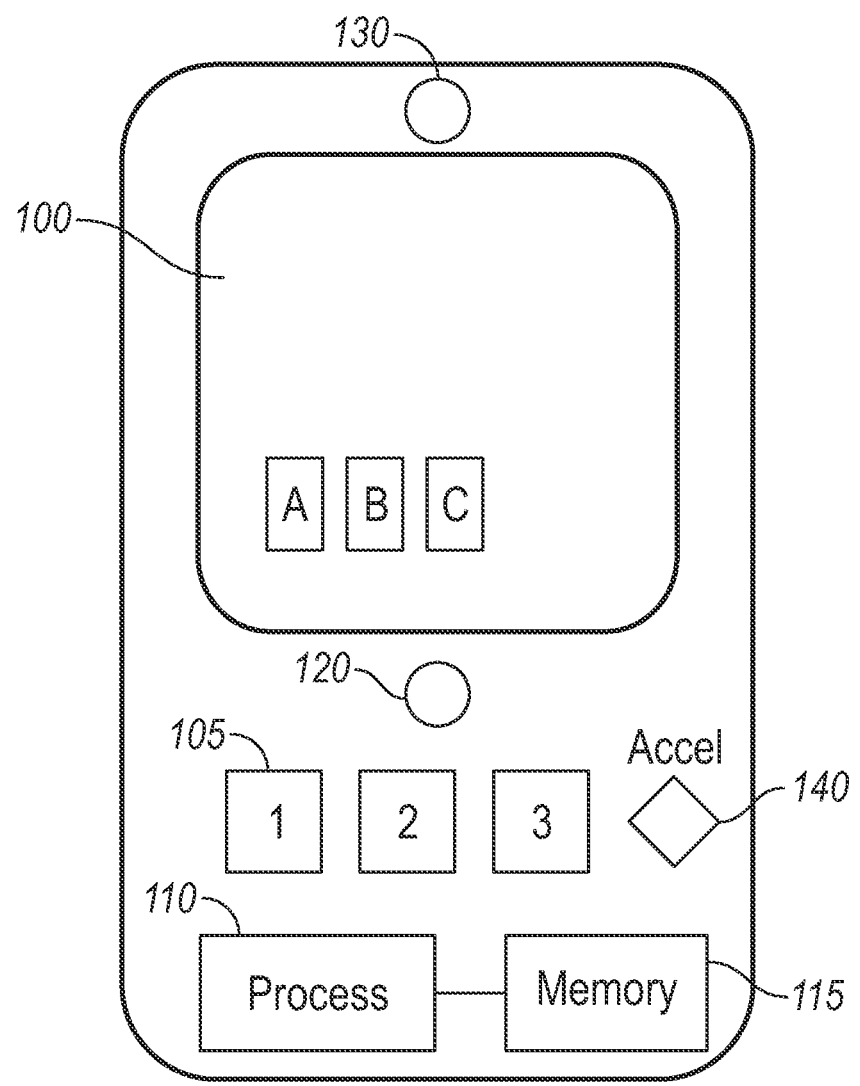
FIG. 1 shows a block diagram of a communication device with a user interface.

A communication device as described herein is shown as a smart phone, e.g. a Blackberry™ which has keys and/or touchscreen, or an iPhone which only has a touchscreen. The techniques described herein can be used in any phone or other communication device, however, which has touchscreen or display 100 and/or has numerical or other keys 105.

The device operates according to one or more processors 110 which run a stored program that is stored in a memory 115, e.g., a solid state memory, hard drive or other mass storage.

In one embodiment, the communication device is a phone. The phone, as conventional, may also include a microphone shown as 120, a camera shown as 130, and many phones also include an acceleration sensor shown as 140. More generally, the acceleration sensor can be any kind of device that detects orientation and/or location of the phone, such as a compass or GPS device, or could be a cell tower or other triangulation device which finds the location of the phone based on its position among cell towers or beacons.

The phone has a housing, and a processor detecting automatically using a program, an unintentional communication event by characterizing the surroundings of the housing. Embodiments describe the characterizing comprises characterizing movement of the housing, and/or characterizing the environments, e.g., light and/or sound of the housing.

The processor 110 runs a program when there is a "send event" at 200, which may occur when one or more keys has been pressed, send has been pressed indicating that a call should be initiated, and/or a speed dial has been pressed. In one embodiment, the program might not be run until two or three keys has been pressed, or before accepting a speed dial type connection. In another embodiment, the program is only run when a send key is pressed, or when a speed dial key is pressed.

An initial step at 205, however, is to determine if the user has dialed "911". If so, then this may be an emergency, and the step of determining anti-butt dialing is bypassed to avoid slowing the placement of the emergency call. Accordingly, if the user dials 911 or any variant requesting emergency services, then the request is immediately sent at 206 without any detection.

If not, flow passes to 210 and/or 220. These steps may be alternatives which may be carried out one before the other or at the same time.

Figure 2:
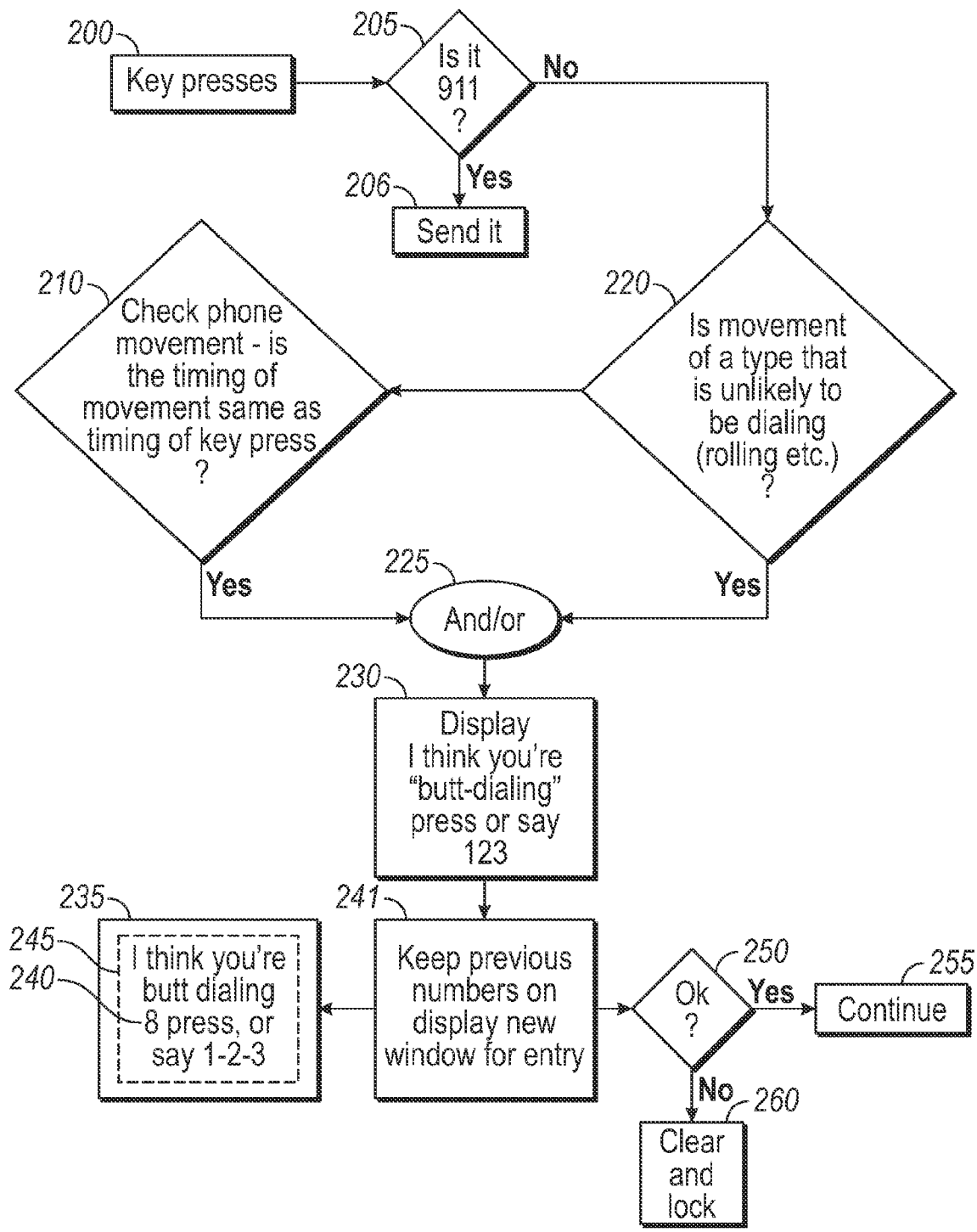
FIG. 2 shows a flowchart of operation that is carried out by a computing part within the communication device to detect the movement.

A first embodiment shown in FIG. 2 looks for, and characterizes movement of the phone. The detection of phone movement may be done in accordance with key press information.

For the movement characterization at 210 and 220, the accelerometer 140 is checked to determine phone movement.

One test at 210 may determine whether the file the timing of the movement is the same as, or in sync with, the timing of the key press. For example, the test may determine if the keys being pressed in the same synchronism, such as at the same tempo, with the physical movement of the phone, or at the same time as reversal of phone movement, or at the same time as pauses in phone movement. The same inertia caused by the user's movements would cause the key presses, so seeing these at the same time is a clue that the dialing is unintentional.

In another test at 220, the system detects stores profiles of conventional movements of the type that the user has when walking, dancing or carrying out some other activity for example. For example, the user may store their own profiles, or previously stored profiles may be maintained. The profiles being detected are those that might indicate that a user is walking, such as a rolling motion, or a side to side motion. While these motions occur during a user walking, usually the phone is kept straight or reasonably straight while dialing, and hence it is less likely that the user is dialing when the phone is moving in that way. More generally, any movement of the phone that would make it difficult for the user to be dialing could be detected in this way.

The movement of the phone is detected by the accelerometer is compared with one or more profiles indicating movement of this type at 220.

Other forms of characterizing movement and/or function at 225 is carried out to determine if either one of these is found. If so, at 230, the system carries out an anti-butt dialing routine.

At 230 the system displays a message such as "I think you Ire butt dialing" or "I think we may be having an unintentional dialing event" or some similar message. The system then operates an unintentional dialing event routine. The system may also produce an audible indication or buzz so that the user can hear and/or feel a warning tone. The system then indicates that the user should press or say some specified number such as 123 at 230. In one embodiment, this query part of the routine is shown as a layer that is semi-transparent, over the main dialing routine.

235 shows the screen. The numbers that the user has entered either intentionally or unintentionally at 240 are still shown on the screen. An overlay 245 may come up with the indication that the system thinks the user is unintentionally dialing. Once this has been displayed at 241, the system determines if the user enters the prompted sequence, such as entering 1 2 3 or speaking 1 2 3 into the microphone at 250.

If the user enters the prompted phrase, then at 255, the call is made. If not, the phone is cleared and locked at 260. The user will be required to enter some unlock code before they can place a call.

Figure 3:
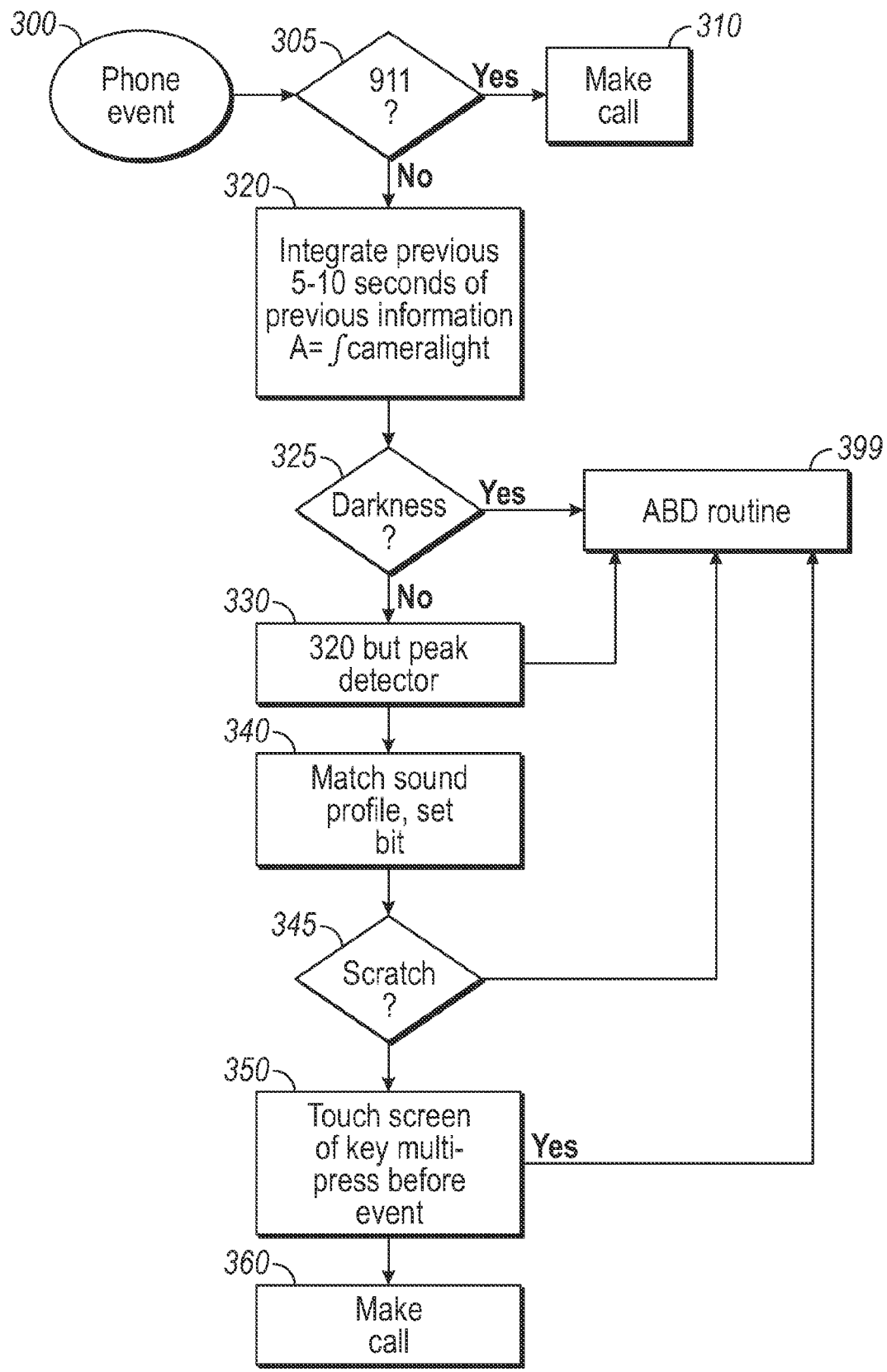
FIG. 3 shows a flowchart of operation where the detected situation is from a microphone or camera in the device.

FIG. 3 shows a second embodiment of detecting unintentional dialing which can be used in conjunction with the embodiment of FIG. 2, or can be used by itself. This may be used for example in a phone that does not have an accelerometer. In this embodiment, either the camera or the microphone may be used to detect situations which may be indicative of the fact that an unintentional dialing event is occurring.

The phone event is detected at 300 and may be any of the same phone events shown in 200 above.

At 305, a detection of an emergency call was made, and if so the call is allowed to be made immediately at 310. If there is a phone event and no emergency call, then a first operation at 320 is carried out. In this embodiment, the electronics in the phone may automatically continuously maintain a 5 to 10 second interval of previous camera information. The variable A, representing ambient light, may be maintained as the integral of the amount of camera light that the camera has received. For example, this may be indicative of the fact that the camera in the portable device is in a user's pocket. For example if the user is using the phone, they usually take it out of their pocket meaning that during the time it is out of their pocket, the camera begins integrating light. Only if/when the camera is in complete or mostly darkness, its ambient value be very low.

When the value is indicative of darkness at 325, the unintentional dialing event routine is executed at 399 which may be the same unintentional dialing event routine that is shown as 230-255 in FIG. 2.

If any of the different detections shown in FIG. 3 can be used with other detections are on their own.

An alternative detection shown in 330 is like 320, but using a peak detector instead of an integrator. This detects the peak light amount during the past 5 to 10 seconds. Again, this takes advantage of the fact that when the user uses their mobile phone, they have to take it out of their pocket, and it will presumably receive light during that time unless they are trying to use the phone in total darkness. Therefore, the peak brightness at 330 will be a brightness amount that is not the same as being in their pocket. If the brightness amount represents darkness at 330, the unintentional dialing event routine at 399 is carried out. 340 represents a sound profile matching technique, where there are a number of profiles of sounds that represent sample sounds of a phone to be in a pocket or purse and moving around in that pocket or purse. Any time that the lock routine is off in the phone, the phone may continually match the sound profile and save it. At 340 indicating that the profile indicates that it is likely moving around in a pocket or purse while unlocked. If that sound is detected at 345, the unintentional dialing event routine is entered at 399.

Another routine at 350 is the touchscreen or keyboard multi-press routine. At 350, the system determines if in some time prior to the send, for example in the last 5 to 10 seconds, there has been one or many instances where multiple different keys were pressed on the user interface at the same time. If so, this is an indication that unintentional dialing is being carried out, and the unintentional dialing routine is entered.

The routine of FIG. 3 may use either or both of camera profiling and! or sound profiling. This may also use the routine of FIG. 2 in addition to the routine of FIG. 3.

If none of the tests are positive, then the call is made normally at 360. If any of the tests are positive, the ABD routine is executed at 399.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example any kind of communication device can be controlled in this way. Moreover, other devices besides communication devices can also be controlled, for example for the purpose of preventing power consumption in such a device. For example, the display for other information can be automatically turned off at such time as the detection detects that the user is not using the portable phone, by accelerometer, camera, sound, or a combination.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, micro controller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35

USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A portable communication device, comprising:
    a housing;
    a processor, in the housing, and detecting information indicative of changes in an environment of the portable communication device,
    said processor also detecting actuations to a user interface of the portable communication device,
    said processor comparing said changes to said actuations, and detecting a synchronism between said changes and said actuations;
    and if said changes are detected to be in synchronism with said actuations, executing a routine that prevents said actuations from carrying out a first function, and otherwise if said changes are not in synchronism with said actuations, carrying out said first function;
    a microphone, in said housing, that operates to sense said changes, said microphone sensing changes to an environmental condition surrounding said housing, wherein said environmental conditions comprises a profile of noises sensed by the microphone.

2. The device as in claim 1, wherein said first function is a function that occurs without further user confirmation and if said changes are detected to be in synchronism with said actuations, said processor requiring user confirmation.

3. The device as in claim 1, wherein said processor compares said changes to at least one profile of movements.

4. The device as in claim 1, wherein said processor further comprises detecting a second communication that is an emergency call, and wherein said second communication is made independent of comparing the changes to the actuations.

5. A method of operating portable communication device, comprising:
    using a processor in a housing of the portable communication device for operating a user interface to detect actuations on the user interface that carry out functions including initiating a first communication;
    using the processor for detecting changes in an environment of the portable communication device;
    comparing said changes to said actuations, and detecting a synchronism between said changes and said actuations;
    if said changes are detected to be in synchronism with said actuations, preventing said actuations from carrying out a first function, and
    if said changes are not in synchronism with said actuations, carrying out said first function, wherein said first function is a function that occurs without further user confirmation and if said changes are detected to be in synchronism with said actuations, requiring user confirmation,
    wherein said processor detects information from a sensor in said housing, said sensor sensing changes to an environmental condition surrounding said housing and said processor detecting information indicative of said changes in the environmental condition,
    wherein said sensor is a microphone, and said environmental condition is a profile of noises sensed by the microphone.

6. A portable communication device, comprising:
    a housing;
    a user interface, in the housing;
    a processor, in the housing, and detecting information indicative of changes in an environment of the portable communication device, said processor detecting changes based on a first output from a camera in the housing, and also detecting changes based on a second output from a microphone in the housing,
    said processor also detecting at least one actuation to the user interface;
    said processor analyzing said changes in both said first output and in said second output, and said actuation, and detecting a relationship between said changes and said actuations;
    said processor preventing said actuations from carrying out a first function when there is a first relationship between said first and second output and said actuations, and allowing said actuation to carry out said first function when there is a second relationship different than the first relationship between said first and second output and said actuation, wherein said relationships comprise temporal synchronization between multiple actuations and outputs from said camera and said microphone.

7. The device as in claim 6, wherein said processor compares said changes to said first output and said second output to at least one profile of movements.

8. The device as in claim 7, wherein said profile comprises a profile of light and darkness.

9. The device as in claim 7, wherein said profile comprises a profile of noises sensed by the microphone.

* * * * *